Nov. 22, 1927.  1,650,265
C. V. FOULDS
METHOD OF MANUFACTURING SEATS FOR BUTTERFLY VALVES
Original Filed Dec. 9, 1925
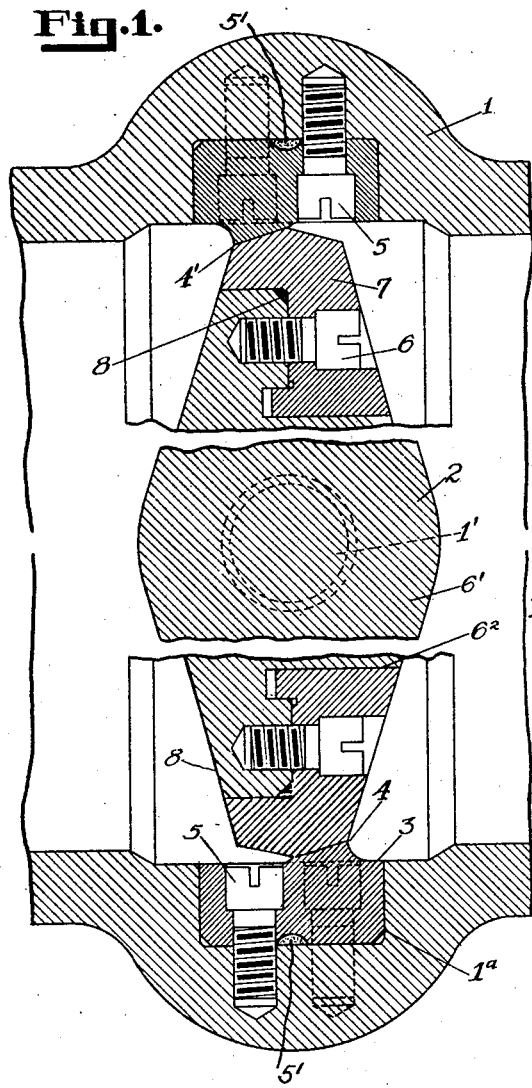
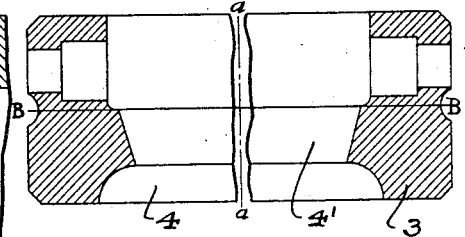
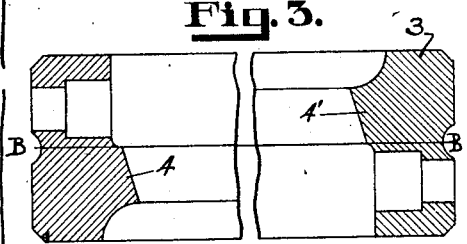
INVENTOR
Charles V. Foulds
BY Harry V. Potter
ATTORNEY Patented Nov. 22, 1927.

1,650,265

UNITED STATES PATENT OFFICE.

CHARLES V. FOULDS, OF OAKLAND, CALIFORNIA, ASSIGNOR TO THE PELTON WATER WHEEL CO., OF SAN FRANCISCO, CALIFORNIA, A CORPORATION OF CALIFORNIA.

METHOD OF MANUFACTURING SEATS FOR BUTTERFLY VALVES.

Original application filed December 9, 1925, Serial No. 74,255. Divided and this application filed August 16, 1926. Serial No. 129,382.

The present invention relates to improvements in butterfly valves, and more particularly to a valve seat, and the method of manufacturing the same, and is a division of my pending application Serial Number 74,255, filed December 9th, 1925.

The invention has for one of its objects to reduce to a minimum the cost of wearing rings of butterfly valves by an improved method of manufacturing the same; to provide means for reducing to a minimum the leakage between the valve and seat when the valve is in closed position, thereby reducing the destructive wear on the edges of the valve and the surface of its seat. Another object is to provide means for compensating for such wear as may occur between the valve and seat thereby enabling the valve to be maintained tight over a long period of time, and eliminating or reducing to a minimum the necessity for frequent costly repairs or replacements.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To comprehend the invention reference is directed to the accompanying drawings wherein:—

Fig. 1 is a horizontal cross section of the preferred form of butterfly valve illustrating a metal to metal contact between the valve and seat.

Fig. 2 is a view in cross section of the wearing ring or valve seat prior to being cut on lines $a$—$a$ to form the valve seat.

Fig. 3 is a detailed view illustrating the method of reversing the halves of the wearing ring or valve seat by rotating them 180° about the axis B—B.

Referring to the drawings wherein like characters of reference designate corresponding parts, 1 indicates a valve body of cylindrical formation, and 2 a valve disk mounted therein on a shaft 1' to pivot in bearings, not shown, and carried at opposite points on the wall of the valve body 1. The inner wall of the body 1 is circumferentially grooved at $1^a$, and within the groove are received circular wearing rings 3 provided with oppositely bevelled seats 4 and 4'. The wearing rings are constructed in the following manner:—

A ring, Fig. 2, shown also as part 3 Fig. 1, of a diameter to snugly fit within the groove $1^a$ is preferably machined in its entirety in one piece, the seating face of the ring 3 being conically tapered to produce, when cut on the line $a$—$a$, the valve periphery seats 4 and 4', Fig. 3. After machining, the ring is cut in halves on line $a$—$a$, and one half reversed with respect to the other, and the same are positioned within the groove $1^a$, one half lying on either side of the shaft 1', and one half reversed by turning it through an arc of 180 degrees in respect to the other, thus positioning the conical portion of the ring in parallel relation on opposite sides of the shaft 1'. The cutting of the ring on the line $a$—$a$ and the reversing of the cut halves, as above described, positions the conical seat 4' with face on the downstream side of the shaft center and the seat 4 with face on the upstream side of the shaft center, as clearly illustrated in Fig. 1. The rings are held in position by threaded studs 5 passing therethrough and engaging the base of the groove $1^a$.

To preclude leakage through the groove $1^a$ there is preferably positioned a gasket 5' in the groove in the outer periphery of the ring, held by the adjustment of the studs 5 against the inner surface of the groove $1^a$.

In the construction shown in Fig. 1, adjustably carried by the valve disk 2 is a disk or wearing ring 7 held to the valve disk by studs 6. The periphery of the ring 7 is oppositely bevelled or tapered to seat against the seats 4 and 4' of the ring 3, and to preclude leakage between the valve disk and the wearing ring 7 is a packing 8 secured by the studs 6. The disk 2 is provided on one face with a center extension 6' receivable within an opening $6^2$ in the center of the ring 7, the extension affording a guide for preventing the lateral movement of the ring relatively to the valve disk 2. In this construction, the rotating of the butterfly valve on its shaft causes a simultaneous seating of the opposite faces of the bevelled peripheral surface of the ring with the respective seats 4 and 4'.

It will be observed that the present structure illustrates a method of forming a valve seat whereby a single machined element when cut transversely and reversed affords corresponding seat portions for disposal at opposite sides of the butterfly mounting shaft.

While a particular form or structure of butterfly valve has been illustrated in the present disclosure it is understood that any form of butterfly valve equipped with any peripheral packing, either separable or integral adapted for cooperating with the seat faces may be employed.

I claim:—

1. The method of making a bevelled seat ring for butterfly valve structures which consists in forming a conical opening in a one piece cylindrical ring, cutting the ring transversely to provide duplicate half sections, reversing the half sections by turning the same on an axis of 180 degrees, and positioning their ends in opposing relation.

2. The method of making a bevelled seat ring for butterfly valve structures which consists in forming a cylindrical ring, bevelling the interior thereof from one side to provide a conical opening, cutting the ring transversely to provide duplicate half sections, reversing the half sections by turning the same on an axis of 180 degrees and positioning the ends in opposing relation.

In testimony whereof I have signed my name to this specification.

CHARLES V. FOULDS.